Dec. 13, 1966  A. G. STIMSON  3,291,996
CAMERA PHOTOCELL WITH MOVABLE LENS FOR MAINTAINING A RELATIVELY
CONSTANT VERTICAL FIELD ANGLE AS THE CAMERA IS ROTATED
Filed Aug. 29, 1963  2 Sheets-Sheet 1

ALLEN G. STIMSON
INVENTOR.

BY R. Frank Smith

Robert W. Hampton

ATTORNEYS

Dec. 13, 1966  A. G. STIMSON  3,291,996
CAMERA PHOTOCELL WITH MOVABLE LENS FOR MAINTAINING A RELATIVELY
CONSTANT VERTICAL FIELD ANGLE AS THE CAMERA IS ROTATED
Filed Aug. 29, 1963  2 Sheets-Sheet 2

ALLEN G. STIMSON
INVENTOR.

BY R. Frank Smith
Robert W Hampton
ATTORNEYS

United States Patent Office 3,291,996
Patented Dec. 13, 1966

3,291,996
CAMERA PHOTOCELL WITH MOVABLE LENS FOR MAINTAINING A RELATIVELY CONSTANT VERTICAL FIELD ANGLE AS THE CAMERA IS ROTATED
Allen G. Stimson, Rochester, N.Y., assignor to Eastman Kodak Company, Rochester, N.Y., a corporation of New Jersey
Filed Aug. 29, 1963, Ser. No. 305,427
7 Claims. (Cl. 250—234)

The present invention relates to cameras having attached or built-in photocells, and more particularly concerns means for automatically regulating illumination of the photocell when the camera is tilted to various angles relative to the horizontal.

In many prior art cameras an attached or built-in photocell constitutes an element of an exposure meter, which in turn is commonly an element of a photoelectric exposure control system. In most such cameras the photocell is illuminated through a vertical angle that is fixed relative to the camera's lens axis. Accordingly, when the camera is tilted upward the cell receives additional skylight and responds by increasing the energization of the meter, so that the lens diaphragm and/or shutter is adjusted commensurately with the brighter background lighting and foreground objects are underexposed.

In order to solve the foregoing problem it has been proposed, in my U.S. Patent 3,023,684, to suspend the photocell and its lens pendularly from the camera frame so that whether the camera is held in a horizontal position or is tilted up or down the cell views substantially the same field. Although this solution to the probelm has proven quite effective it requires flexible electrical connections between the photocell and the fixed meter or exposure control elements.

Accordingly, it is an object of the present invention to illuminate the photocell in a camera from substantially the same vertical scene angle when the camera is held level or is tilted up or down, yet to avoid any need for flexible connections between the cell and other camera elements. This object is accomplished by mounting the cell rigidly in the camera and pendularly suspending at least an element of its optical system.

More specifically, it is an object of the invention to illuminate a photocell through pendularly-controlled, variable light deflector.

Other objects of the invention will appear from the following description, reference being made to the accompanying drawings, wherein.

Figure 1:
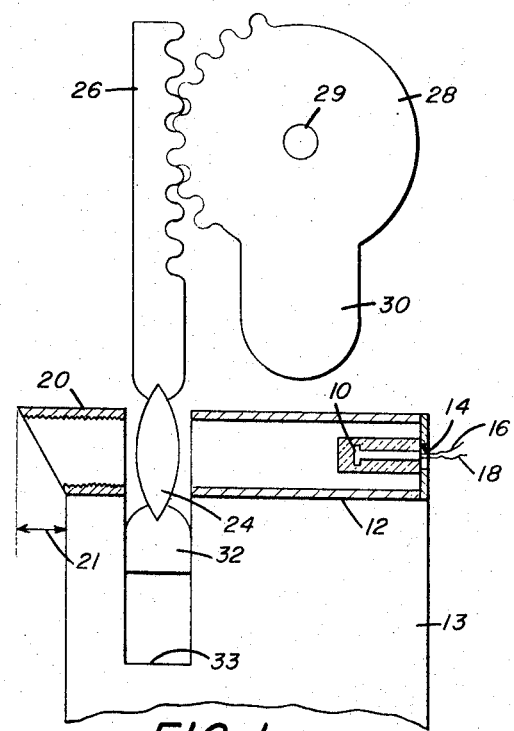
FIGS. 1 to 3 are side views, partly in section, of one embodiment of the invention, illustrating the positions of the photocell and its light deflector relative to the horizontal when the camera is held at various angles about a horizontal axis perpendicular to the axis of the taking lens.
Figure 2:
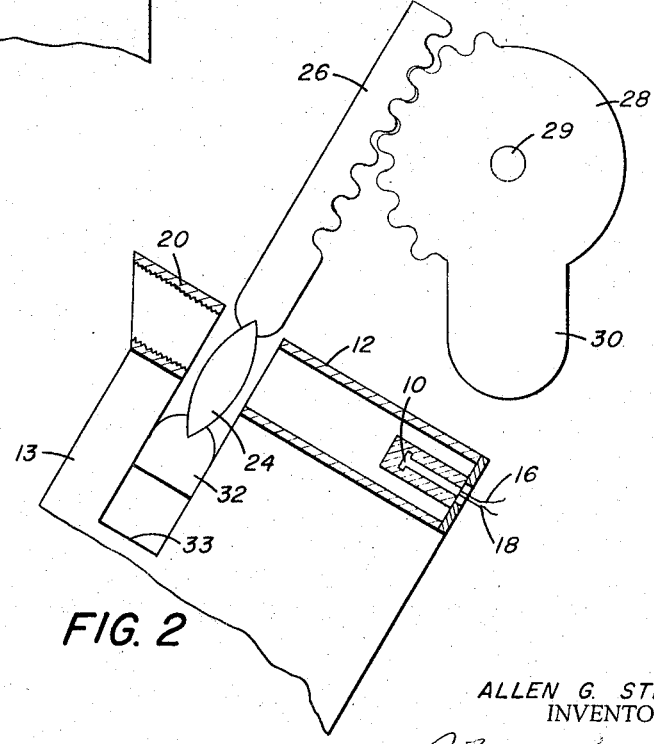
Figure 3:
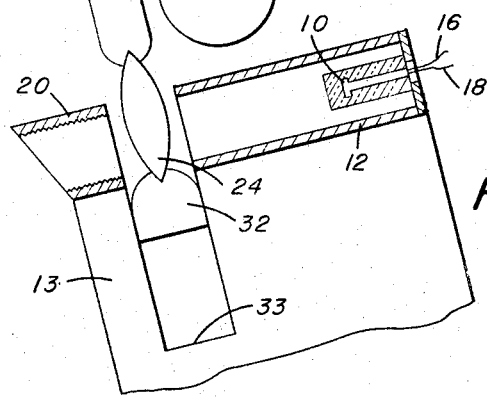

Referring to FIGS. 1 to 3, a photocell 10 is mounted on the inner, rear surface of a tube 12, which is mounted on a frame member 13 of a camera. Tube 12 has an aperture 14 through which the usual electrical leads 16 and 18 of the cell communicate with other elements of the camera. An open second tube 20 also is mounted on member 13 and is axially aligned with and spaced forwardly from the open front end of tube 12. Tube 20 may be provided with a roughened inner surface 22, which minimizes the reflection of light that enters the front end of tube 20.

A variable light deflector, which is illustrated in FIGS. 1 to 3 as a movable positive field lens 24, is supported for vertical movement in the space between tubes 12 and 20. Lens 24 has a counterweight 32 which is guided by a slot 33 in frame member 13 for movement perpendicular to the common axis of tubes 12 and 20.

When the camera is held in a horizontal position, as shown in FIG. 1, the optical axis of lens 24 is approximately coincident with the common axis of tubes 12 and 20, and cell 10 is illuminated by field light from both above and below the coincident axes. A slight overhang may be provided on tube 20, as illustrated at 21, to exclude some skylight. When the camera is tilted upward, weighted extension 30 of pinion 28 remains in the same position relative to the horizontal and therefore pinion 28 rotates counterclockwise relative to rack 26, thereby lowering both rack 26 and lens 24 relative to tubes 12 and 20 and aligning an upper zone of the lens with the tube axis. This, in effect, causes the photocell to be illuminated with light more from below the axis of the tubes than is the case in FIG. 1, such that a substantial portion of the skylight again is excluded. Similarly, when the camera is tilted downward, as shown in FIG. 3, lens 24 is raised relative to the tube axis and illuminates cell 10 with light more from above the tubes than is the case in FIG. 1.

It will be seen that the foregoing structure compensates, at least in part, for tilting the cell upward or downward with the camera, such that when the camera is tilted through any given angle the vertical limits of the field of illumination of the cell are moved through a smaller angle if at all.

Figure 4:
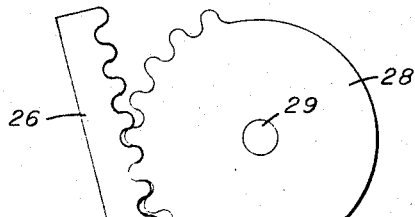
FIG. 4 illustrates the use of a double prism as a variable light deflector.
Figure 4:
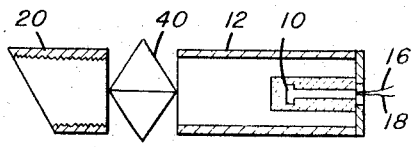

FIG. 4 illustrates how a pair of symmetrically disposed prisms, or a double prism, 40 can be used in place of the positive lens 24 of FIGS. 1–3. Such a prism arrangement has light-deflection properties similar enough to a positive lens to accomplish substantially the same result in this invention.

Figure 5:
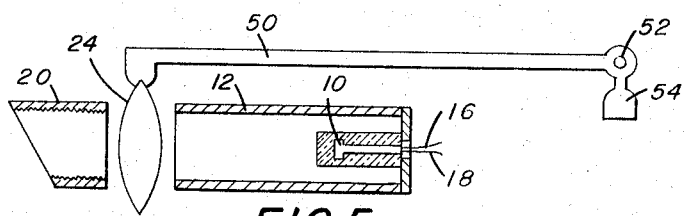
FIG. 5 is a view similar to FIGS. 1 to 3, illustrating a second form of pendular suspension of the light deflector.

FIG. 5 illustrates an alternate form of pendular suspension of the light deflector. A beam 50, which is pivoted at 52, supports the lens or prism and is pendularly weighted at 54 to maintain the beam in substantially a horizontal (or other selected) position, regardless of the angle at which the camera is held.

Figure 6:
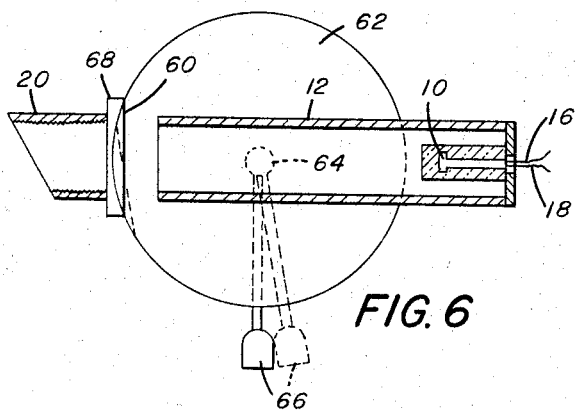
FIG. 6 is a view similar to FIGS. 1 to 3, illustrating a third form of light deflector and a pendular suspension therefor.

FIG. 6 illustrates a third form of variable light deflector, comprising a positive lens 60 having, for example, a convex forward surface and a plane rear surface. Lens 60 is mounted on a disk 62 and extends laterally from the disk into the space between tubes 12 and 20. Disk 62 is rotatably mounted at 64 and has a central pendulum 66 by means of which it maintains the axis of lens 60 in a substantially horizontal position, or in any other preselected position. The position of lens 60 relative to tubes 12 and 20, when the camera is tilted upward, is illustrated in FIG. 6 in broken lines.

A plano concave lens 68, whose concave surface may have approximately the opposite curvature as the convex forward surface of lens 60, can be fixed on the camera such that its axis substantially coincides with that of lens 60 when the camera is held in a normal picture-taking position, e.g., with the lens and axes horizontal. Lens 68, which reduces or eliminates magnification in the photocell lens system, may either abut or be spaced from lens 60.

The invention has been described in detail with particular reference to preferred embodiments thereof, but it will be understood that variations and modifications can be effected within the spirit and scope of the invention as described hereinabove and as defined in the appended claims.

I claim:

1. An optical system for regulating the elevation of the vertical field angle from which a photoelectric cell is illuminated, comprising: a tiltable frame supporting said cell; a light deflector for directing light onto said cell; and pendular means supporting said deflector for moving at least a part of said deflector relative to said cell when said frame and cell are tilted up or down, the direction of relative movement of said deflector part being such that the angular movement of the vertical limits of the field of illumination of said cell is less than the angle through which said cell is tilted.

2. The optical system defined in claim 1, wherein said deflector comprises a positive lens.

3. The optical system defined in claim 2, with a planoconcave front lens element which is stationary relative to said cell and which cooperates with said positive lens.

4. The optical system defined in claim 1, wherein said deflector comprises a double prism.

5. The optical system defined in claim 1, wherein said pendular means comprises: a gear rack supporting said deflector part; a gear pinion meshing with said rack; and a pendulum supported by said pinion.

6. The optical system defined in claim 1, wherein said pendular means comprises: a beam supporting said deflector part; and a pendulum supported by said beam.

7. The optical system defined in claim 1, wherein said pendular means comprises: an angularly movable member supporting said deflector part; and a pendulum supported by said member.

References Cited by the Examiner

UNITED STATES PATENTS 2,076,482    4/1937    Riszdorfer _____ 95—81.5

RALPH G. NILSON, *Primary Examiner.*

M. ABRAMSON, *Assistant Examiner.*